US012781936B2

(12) United States Patent
Kim

(10) Patent No.: US 12,781,936 B2
(45) Date of Patent: Nov. 3, 2026

(54) VEHICLE LAMP

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/312,511

(22) Filed: Aug. 28, 2025

(65) Prior Publication Data

US 2026/0243403 A1 Aug. 20, 2026

(30) Foreign Application Priority Data

Feb. 14, 2025 (KR) ........................ 10-2025-0019581

(51) Int. Cl.

| | |
|---|---|
| ***F21S 41/20*** | (2018.01) |
| ***B60Q 1/00*** | (2006.01) |
| ***H04R 1/02*** | (2006.01) |
| ***H04R 17/00*** | (2006.01) |
| *B60Q 5/00* | (2006.01) |

(52) U.S. Cl.

CPC .......... *F21S 41/285* (2018.01); *B60Q 1/0017* (2013.01); *H04R 1/025* (2013.01); *H04R 1/028* (2013.01); *H04R 17/00* (2013.01); *B60Q 5/00* (2013.01); *H04R 2499/13* (2013.01)

(58) Field of Classification Search

CPC ..... F21S 41/285; B60Q 1/0017; H04R 1/025; H04R 1/028; H04R 2499/13

See application file for complete search history.

(56) References Cited

U.S. PATENT DOCUMENTS 4,794,500 A * 12/1988 Bradley ................ F21S 41/194 362/519
5,700,079 A * 12/1997 Woerner .............. B60Q 1/0088 362/459
2014/0146557 A1* 5/2014 Dums ................... F21S 41/285 362/520
2014/0177253 A1* 6/2014 Weissenberger ...... F21S 41/143 362/512
2014/0226357 A1* 8/2014 Brendle ................ F21S 41/285 362/547
2015/0176795 A1* 6/2015 Kikuchi ................. B60Q 1/076 362/523
2023/0123728 A1* 4/2023 Reiter ..................... B60S 1/026 134/56 R
2023/0391248 A1* 12/2023 Kim ....................... H04R 7/127

* cited by examiner

*Primary Examiner* — Christopher E Dunay
(74) *Attorney, Agent, or Firm* — NSIP Law

(57) ABSTRACT

A vehicle lamp and a system therefor are provided. The vehicle lamp includes a light source to generate light, a housing having a front surface, the housing being able to open and close, and accommodate the light source, an outer lens coupled to the housing to cover the front surface of the housing to emit the light radiated from the light source to a front side, a piezoelectric element mounted on a rear surface of the outer lens to vibrate the outer lens, and a repair cover detachably coupled to a rear surface of the housing and to permit access to the piezoelectric element.

4 Claims, 10 Drawing Sheets

VEHICLE LAMP

CROSS-REFERENCE TO RELATED APPLICATION

This application claims the benefit under 35 USC § 119(a) of priority to Korean Patent Application No. 10-2025-0019581, filed in the Korean Intellectual Property Office on Feb. 14, 2025, the entire contents of which are incorporated herein by reference for all purposes.

BACKGROUND

1. Field

The present disclosure relates to a vehicle lamp.

2. Description of the Related Art

A headlamp of a vehicle plays an important role in both a function and design of the vehicle. The headlamp functions to ensure a field of a view of a driver at night and to inform other vehicles or pedestrians of the presence of the vehicle. The headlamp is an important design element that is called eyes of the vehicle. The headlamp is a major component that is changed in a partial change (facelift) model, etc.

In recent years, the vehicle headlamp is provided not only to radiate light to simply ensure a front field of a view but also to perform entertainment or communication functions through output of various image signals.

Further, in recent years, various technologies have been developed for outputting audio signals as well as video signals. For example, a sound device for outputting audio may be mounted on a space between a lamp housing and an outer lens.

However, in general, the vehicle lamp uses an adhesive when the outer lens and the housing are coupled to each other to prevent moisture, and thus when the sound device malfunctions, the entire lamp should be replaced. Accordingly, it is difficult to manage the lamp, and a consumer burden due to the replacement of the lamp increases.

Thus, it is necessary to improve a technology that facilitates repair and replacement of the sound device when the sound device malfunctions.

SUMMARY

The present disclosure has been made to solve the above-mentioned problems occurring in the prior art while advantages achieved by the prior art are maintained intact.

An aspect of the present disclosure provides a vehicle lamp that allows an operator to easily observe whether a piezoelectric element is defective and to approach the piezoelectric element and replace only the piezoelectric element even when the piezoelectric element is defective.

Another aspect of the present disclosure provides a vehicle lamp that may facilitate management of the vehicle lamp capable of outputting audio to further activate a communication function of a vehicle and secure product competitiveness.

The technical problems to be solved by the present disclosure are not limited to the aforementioned problems, and any other technical problems not mentioned herein will be clearly understood from the following description by those skilled in the art to which the present disclosure pertains.

In a general aspect, a vehicle lamp includes: a light source configured to generate light; a housing having a front surface and configured to open and close, and accommodate the light source; an outer lens coupled to the housing to cover the front surface of the housing and configured to emit the light radiated from the light source to a front side; a piezoelectric element mounted on a rear surface of the outer lens and configured to vibrate the outer lens; and a repair cover detachably coupled to a rear surface of the housing and configured to permit access to the piezoelectric element.

The housing may have a through-hole that allows an accommodation space inside the housing and a rear side of the housing to communicate with each other, and the repair cover may be provided to cover the housing.

When the repair cover is separated from the housing, the through-hole may be formed at a position at which the piezoelectric element is observed through the through-hole or a position that approaches the piezoelectric element.

The repair cover may be screw-coupled to the housing.

The repair cover may include a cover body portion that covers the through-hole and a coupling portion extending from the cover body portion, inserted into the through-hole, and coupled to the housing.

The housing may have a housing screw thread formed on a circumference of the through-hole, and the coupling portion may have a cover screw thread engaged with the housing screw thread.

The repair cover may further include a packing portion provided in the coupling portion to seal the through-hole and the repair cover therebetween.

The repair cover may further include a bracket mounted on the coupling portion, a moisture absorbing space formed to be surrounded by the bracket, the coupling portion, and the cover body portion and provided to communicate with an inner space of the housing, and a moisture absorbent accommodated in the moisture absorbing space.

The vehicle lamp may further include an interference component located inside the housing on an approach path for approaching the piezoelectric element from the through-hole, wherein the interference component may be detachably provided.

In another general aspect, a vehicle lamp system includes: a light source configured to generate light; a housing having a front surface and configured to open and close, and accommodate the light source; an outer lens coupled to the housing to cover the front surface of the housing and configured to emit the light radiated from the light source to a front side; a piezoelectric element mounted on a rear surface of the outer lens; a controller configured to control the piezoelectric element to vibrate the outer lens to generate sound; and a repair cover detachably coupled to a rear surface of the housing and configured to permit access to the piezoelectric element.

The housing may have a through-hole configured to allow an accommodation space inside the housing and a rear side of the housing to communicate with each other, wherein the repair cover is provided to cover the housing.

When the repair cover is separated from the housing, the through-hole may be formed at a position at which the piezoelectric element is observed through the through-hole or a position that approaches the piezoelectric element.

The repair cover may be screw-coupled to the housing.

The repair cover may include a cover body portion configured to cover the through-hole, and a coupling portion extending from the cover body portion, inserted into the through-hole, and coupled to the housing.

The vehicle lamp system may further include an interference component located inside the housing on an approach path for approaching the piezoelectric element from the through-hole, wherein the interference component is detachably provided.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 1:
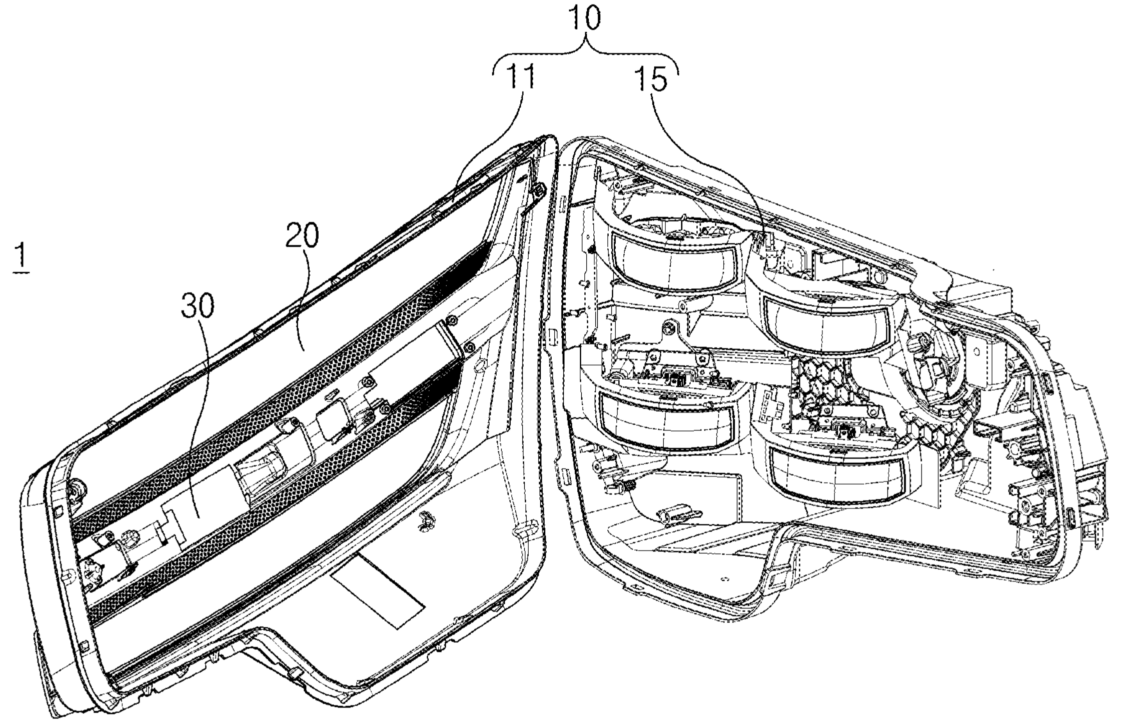
FIG. 1 is an exploded perspective view illustrating a vehicle lamp according to an embodiment of the present disclosure and is a view for describing a rear surface of an outer lens and a front surface of a housing.
Figure 2:
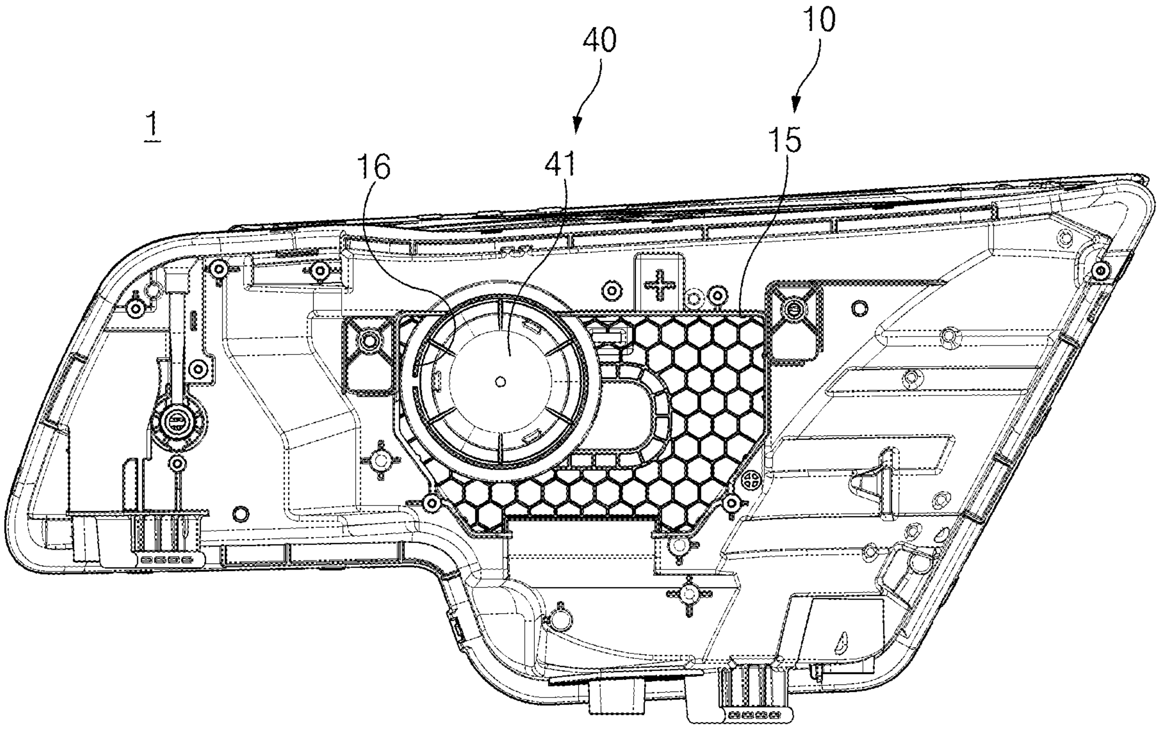
FIG. 2 is a front view illustrating a rear surface of the housing according to the embodiment of the present disclosure and is a view illustrating a state in which a repair cover is mounted.
Figure 3:
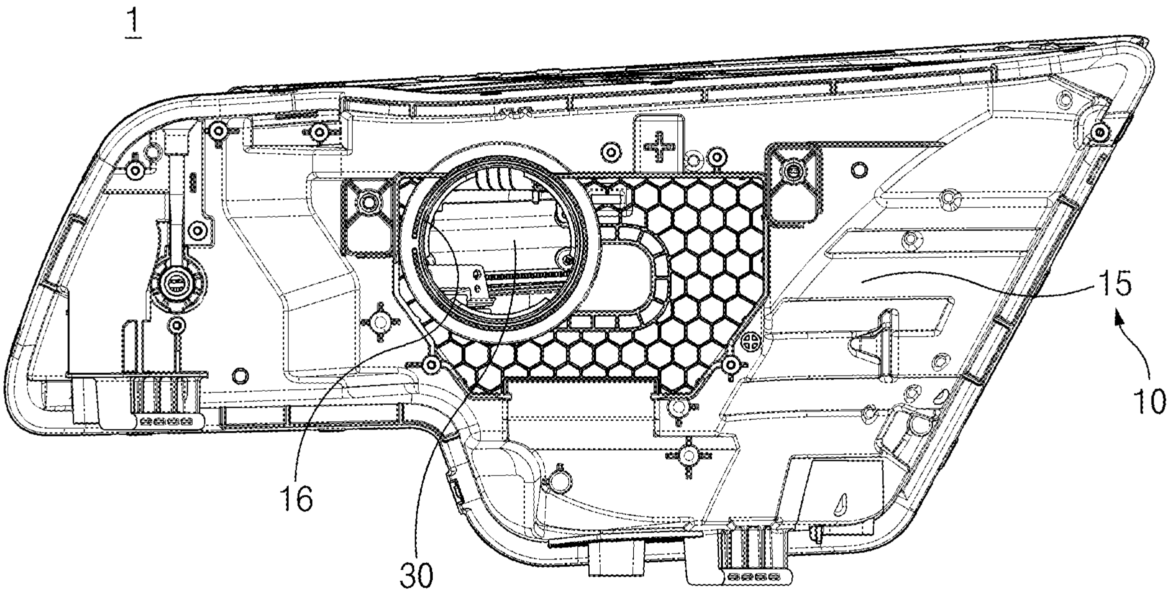
FIG. 3 is a front view illustrating a state in which the repair cover is removed from FIG. 2.
Figure 4:
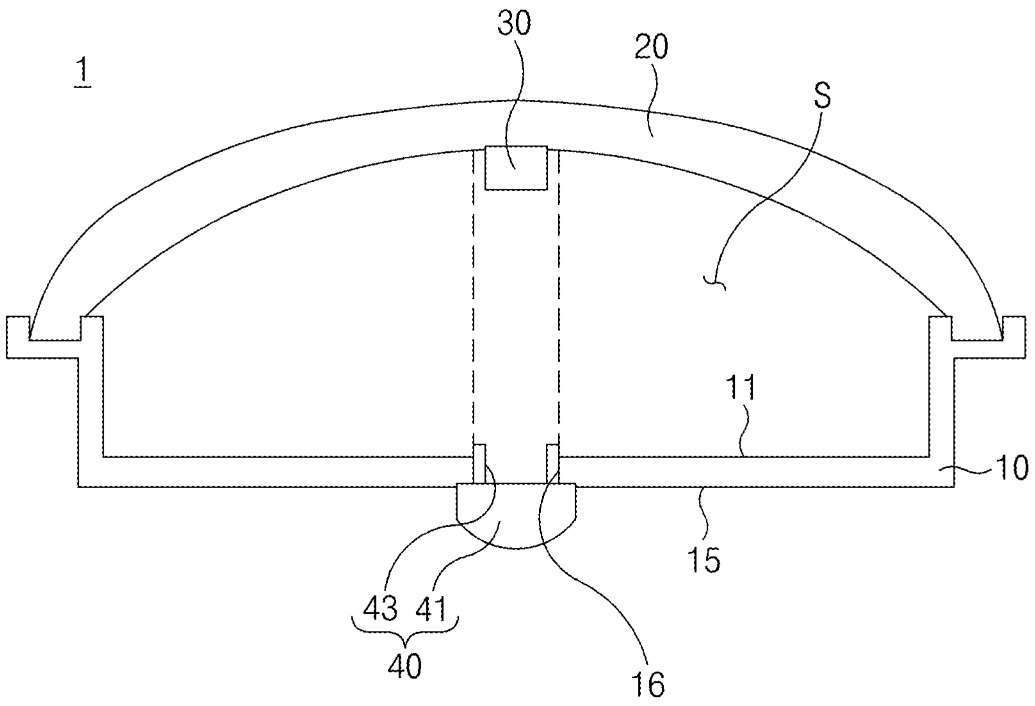
FIG. 4 is a schematic cross-sectional view illustrating a configuration of the vehicle lamp according to the embodiment of the present disclosure and is a horizontal cross-sectional view for describing a positional relationship between a piezoelectric element and the repair cover.
Figure 5:
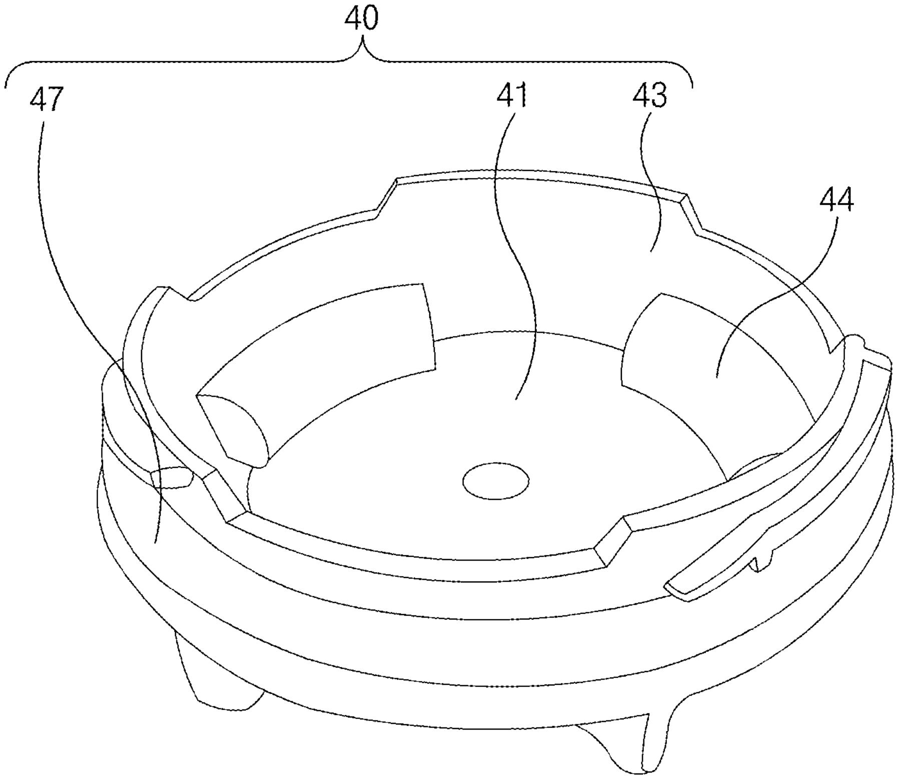
FIG. 5 is a perspective view illustrating the repair cover according to the embodiment of the present disclosure.
Figure 6:
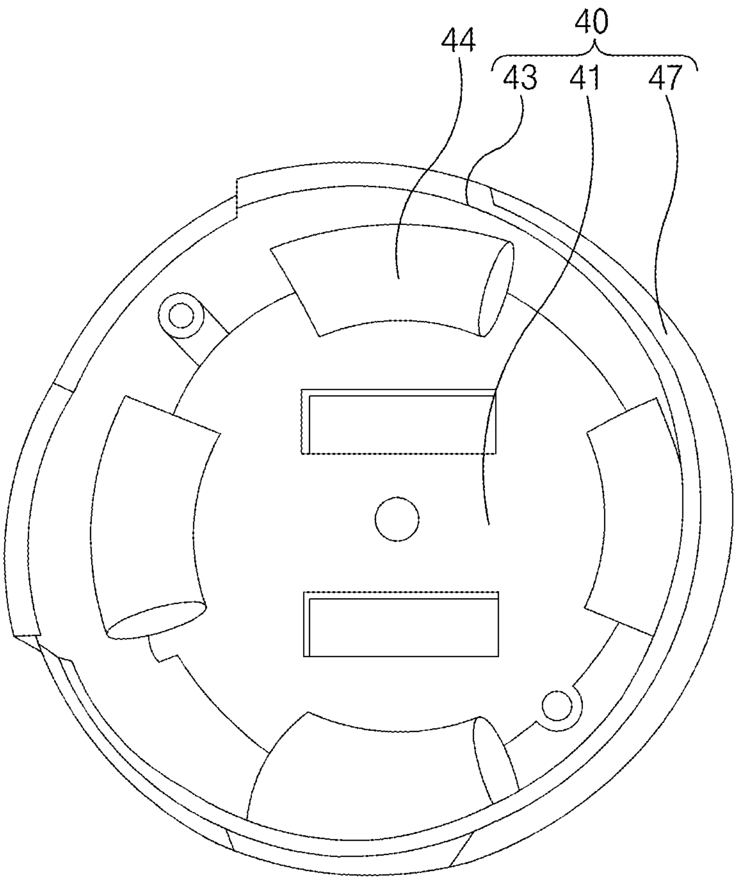
FIG. 6 is a front view illustrating the repair cover according to the embodiment of the present disclosure and is a view illustrating an inner surface of the repair cover.
Figure 7:
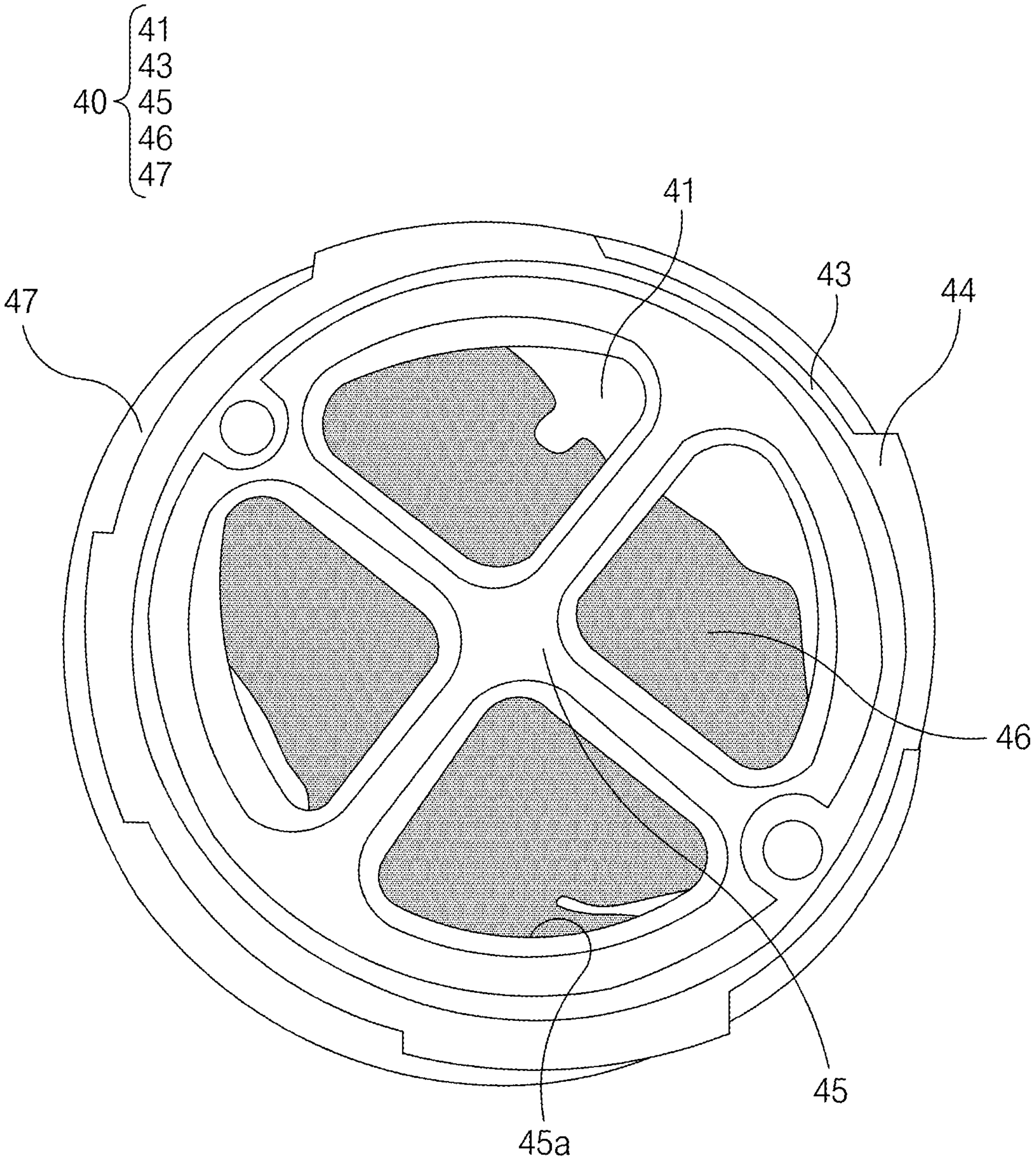
FIG. 7 illustrates a modification of the repair cover according to the embodiment of the present disclosure and is a view for describing an embodiment in which a moisture absorbent is included in the repair cover.

FIG. 1 is an exploded perspective view illustrating a vehicle lamp according to an embodiment of the present disclosure and is a view for describing a rear surface of an outer lens and a front surface of a housing, FIG. 2 is a front view illustrating a rear surface of the housing according to the embodiment of the present disclosure and is a view illustrating a state in which a repair cover is mounted, FIG. 3 is a front view illustrating a state in which the repair cover is removed from FIG. 2, FIG. 4 is a schematic cross-sectional view illustrating a configuration of the vehicle lamp according to the embodiment of the present disclosure and is a horizontal cross-sectional view for describing a positional relationship between a piezoelectric element and the repair cover, FIG. 5 is a perspective view illustrating the repair cover according to the embodiment of the present disclosure, FIG. 6 is a front view illustrating the repair cover according to the embodiment of the present disclosure and is a view illustrating an inner surface of the repair cover, and FIG. 7 illustrates a modification of the repair cover according to the embodiment of the present disclosure and is a view for describing an embodiment in which a moisture absorbent is included in the repair cover.

Figure 8:
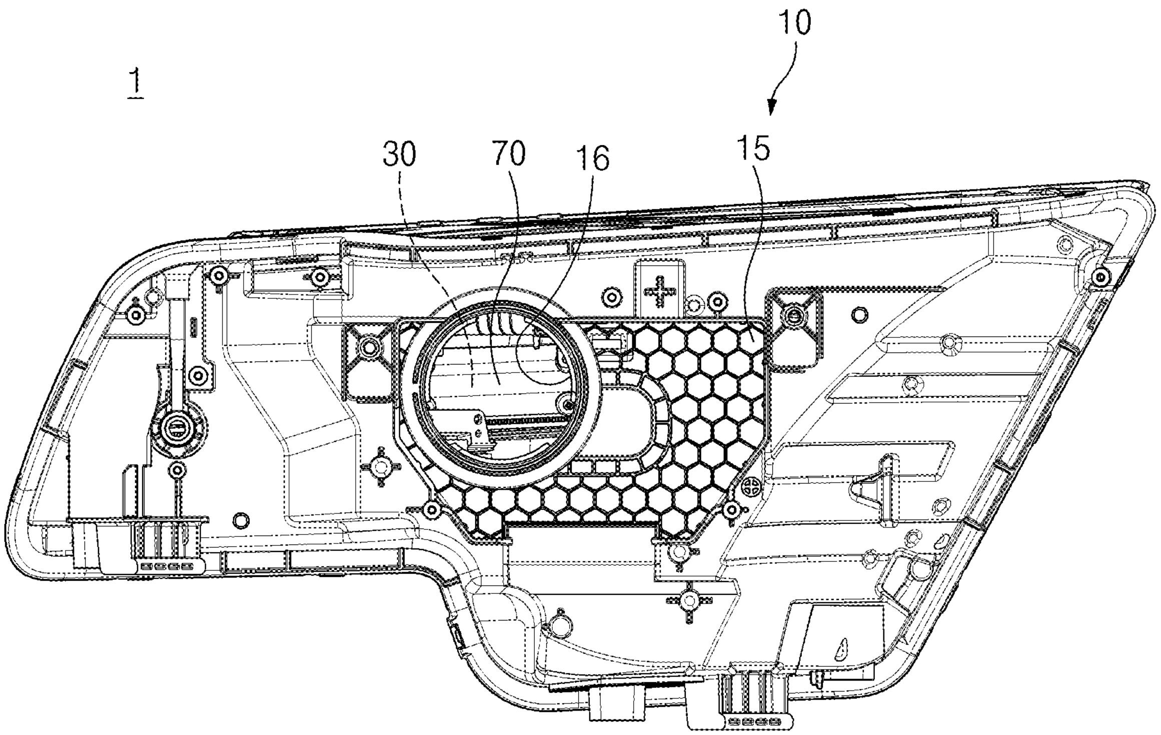
FIG. 8 is a view for describing a vehicle lamp according to another embodiment of the present disclosure and is a view for describing a case in which an interference component is positioned on an approach path for approaching a piezoelectric element from a through-hole.
Figure 9:
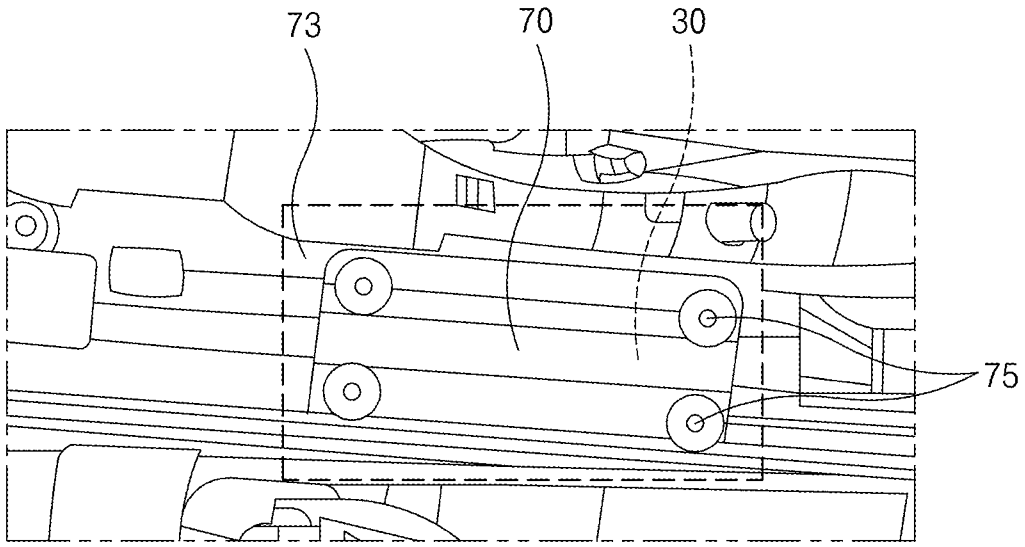
FIG. 9 is an enlarged perspective view illustrating another embodiment of the present disclosure and is a view for describing a coupled state of the interference component.
Figure 10:
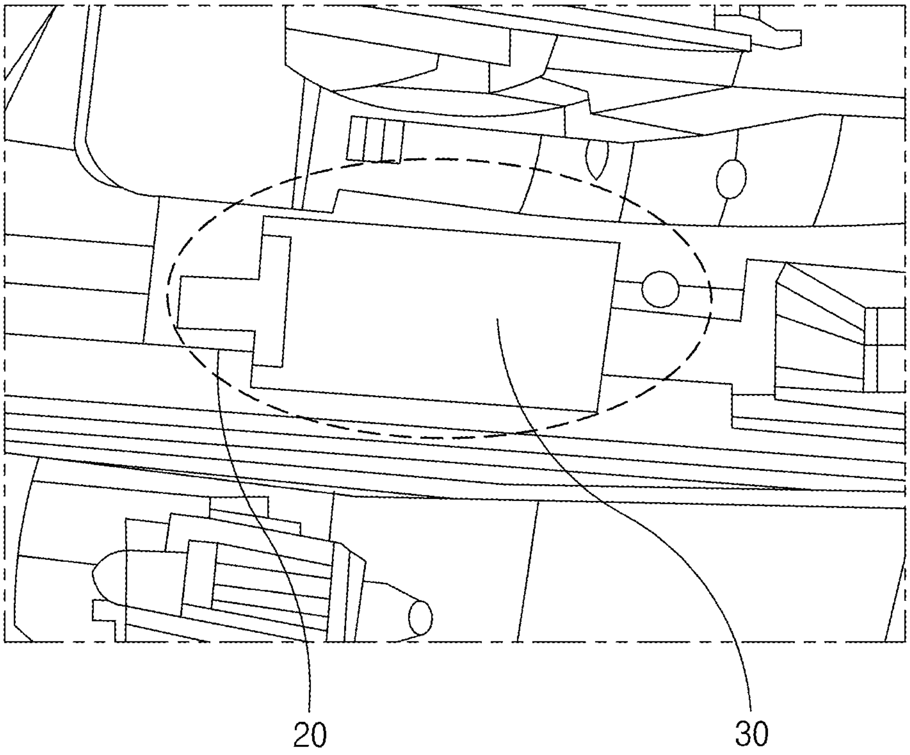
FIG. 10 is an enlarged perspective view illustrating another embodiment of the present disclosure and is a view illustrating a state in which the interference component is removed to approach the piezoelectric element.

FIG. 8 is a view for describing a vehicle lamp according to another embodiment of the present disclosure and is a view for describing a case in which an interference component is positioned on an approach path for approaching a piezoelectric element from a through-hole, FIG. 9 is an enlarged perspective view illustrating another embodiment of the present disclosure and is a view for describing a coupled state of the interference component, and FIG. 10 is an enlarged perspective view illustrating another embodiment of the present disclosure and is a view illustrating a state in which the interference component is removed to approach the piezoelectric element.

Referring to FIGS. 1 to 10, a vehicle lamp 1 according to an embodiment of the present disclosure includes a light source, a housing 10, an outer lens 20, a piezoelectric element 30, and a repair cover 40.

The light source generates light.

For example, the light source may be provided to radiate light to a front side toward the outer lens 20. Further, for example, the light source may be referred to as a light emitting diode (hereinafter, referred to as an LED). However, a direction of radiation of the light source and a type of the light source are not limited thereto. Here, the front side corresponds to a direction in which light is emitted through the outer lens 20.

A front surface 11 of the housing 10 is opened and the light source is accommodated in the housing 10.

In detail, the front surface 11 of the housing 10 may be opened, but a space may be formed thereinside, and optical components including the light source may be accommodated in an inner space "S." The housing 10 may be located inside a vehicle and may be coupled to a frame formed inside the vehicle.

The outer lens 20 is coupled to the housing 10 to cover the front surface 11 of the housing 10 and is provided to emit the light radiated from the light source to the front side.

Further, the piezoelectric element 30 is mounted on a rear surface 15 of the outer lens 20 to vibrate the outer lens 20.

In detail, the outer lens 20 may be disposed on the open front surface 11 of the housing 10 and may cover the front surface 11 of the housing 10 to seal the inner space "S" of the housing 10. Optical components such as the light source may be arranged in a closed space formed between the housing 10 and the outer lens 20. The outer lens 20 may serve to prevent the light source and internal components from being exposed to the outside, and at the same time, may serve to emit light radiated from the light source to the front side.

Further, the outer lens 20 may serve as a diaphragm that vibrates by the piezoelectric element 30 to output sound. In detail, the vibration generated in the outer lens 20 may be propagated into air and recognized as sound.

The piezoelectric element 30 is an element that inversely uses a piezoelectric effect that generates electricity when a pressure is applied thereto, and when an electrical signal is applied thereto, a piezoelectric material may be repeatedly contracted and expanded, thereby causing vibration. Accordingly, sound may be output according to the vibration generated from the surface of the outer lens 20.

For example, a laminated structure in which a plurality of layers of piezoelectric materials overlap each other may be applied to the piezoelectric element 30, so that an applied voltage per unit thickness may increase to maximize the piezoelectric effect. Accordingly, high displacement may be generated even with a low voltage. The piezoelectric element 30 may be fixed to be in close contact with the outer lens 20 by a widely-known method.

The repair cover 40 is detachably provided on the rear surface 15 of the housing 10 to approach the piezoelectric element 30.

In detail, the repair cover 40 is formed to be approach the piezoelectric element 30 for repair of the piezoelectric element 30. The repair cover 40 according to the present disclosure may be formed at a position at which an operator may approach the piezoelectric element 30 when being separated from the housing 10.

In more detail, the housing 10 may have a through-hole 16 that allows an accommodation space inside the housing 10 and a rear side of the housing 10 to communicate with each other. Further, the repair cover 40 may be provided to cover the housing 10.

Here, when the piezoelectric element 30 is separated from the housing 10, the operator can intuitively observe the piezoelectric element 30 attached to the rear surface 15 of the outer lens 20 through the through-hole 16 and may approach the piezoelectric element 30 and easily repair the piezoelectric element 30.

In this way, the vehicle lamp 1 according to the embodiment of the present disclosure has the repair cover 40 that may approach the piezoelectric element 30 on the rear surface 15 of the housing 10. Thus, it is easy to observe whether the piezoelectric element 30 is defective, and even when the piezoelectric element 30 is defective, the operator may approach the piezoelectric element 30 and replace only the piezoelectric element 30.

Accordingly, according to the embodiment of the present disclosure, unlike the related art in which the entire lamp should be replaced when the sound device is defective, only the piezoelectric element 30 may be replaced, thereby reducing burden on consumers.

Thus, according to the embodiment of the present disclosure, since it is easy to manage the vehicle lamp 1 capable of outputting sound, a communication function of the vehicle may be further activated and product competitiveness may be secured.

The through-hole 16 may be formed at a position at which the piezoelectric element 30 may be observed through the through-hole 16 or a position that may approach the piezoelectric element 30 when the repair cover 40 is separated from the housing 10.

In detail, referring to FIGS. 3 and 4, the repair cover 40 may be disposed in a front-rear direction with the piezoelectric element 30 and the inner space "S" of the housing 10 interposed therebetween. Alternatively, although not illustrated, the repair cover 40 may be disposed on a diagonal line with the inner space "S" of the housing 10 interposed therebetween.

Here, the position at which the piezoelectric element 30 may be observed is a position at which it is allowed to observe a state of the piezoelectric element 30 through the through-hole 16 when the repair cover 40 is separated. Further, the position that may approach the piezoelectric element 30 is a position at which the operator reaches an inside of the housing 10 with hands or tools through the through-hole 16 to approach the piezoelectric element 30.

Thus, in addition to the illustrated arrangement, the piezoelectric element 30 and the repair cover 40 may be changed into various arrangements as long as a state of the piezoelectric element 30 may be observed through the through-hole 16 when the repair cover 40 is separated or the operator may reach the inside of the housing 10 with hands or tools to approach the piezoelectric element 30.

Meanwhile, for example, the repair cover 40 may be screw-coupled to the housing 10. Accordingly, the repair cover 40 may be detachably coupled to the housing 10.

However, the coupling between the repair cover 40 and the housing 10 is not limited to the above-described screw-coupling, and various coupling methods may be applied as long as the repair cover 40 may be detachably coupled.

In detail, the repair cover 40 may include a cover body portion 41 that covers the through-hole 16 and a coupling portion 43 extending from the cover body portion 41. Here, the coupling portion 43 may be inserted into the through-hole 16 and coupled to the housing 10.

As the coupling portion 43 is fixedly inserted into the through-hole 16, the repair cover 40 and the housing 10 may be detachably coupled. Further, the through-hole 16 may be covered by the cover body portion 41, and thus the housing 10 and the repair cover 40 may be sealed therebetween.

In more detail, the housing 10 may have a housing screw thread formed on a circumference of the through-hole 16. Further, the coupling portion 43 may have a cover screw thread 44 engaged with the housing screw thread.

Accordingly, when the coupling portion 43 is inserted into the through-hole 16, the housing screw thread and the cover screw thread 44 may be screw-coupled to each other, and thus the repair cover 40 may be coupled to the housing 10.

Meanwhile, referring to FIGS. 5 to 7, the repair cover 40 may further include a packing portion 47. The packing portion 47 may be provided in the coupling portion 43 to seal the through-hole 16 and the repair cover 40 therebetween.

For example, the packing portion 47 may be provided as a rubber O-ring and may be fitted in a circumference of the coupling portion 43. The packing portion 47 may form airtightness between the repair cover 40 and the housing 10. Accordingly, it is possible to prevent moisture from being generated in the inner space "S" of the housing 10.

Meanwhile, referring to FIG. 7, the repair cover 40 according to another embodiment of the present disclosure may further include a bracket 45, a moisture absorbing space, and a moisture absorbent 46.

The bracket 45 may be mounted on the coupling portion 43. The moisture absorbing space may be formed to be surrounded by the bracket 45, the coupling portion 43, and the cover body portion 41 and may be provided to communicate with the inner space "S" of the housing 10. Further, the moisture absorbent 46 may be accommodated in the moisture absorbing space.

Further, for example, the bracket 45 may be detachably coupled to the coupling portion 43 or the cover body portion 41, so that the moisture absorbent 46 may be easily replaced.

In detail, the moisture absorbent 46 accommodated in the moisture absorbing space is configured to prevent moisture from being formed in a space between the housing 10 and the outer lens 20. The bracket 45 may be provided in the form of a frame and provided such that the moisture absorbent 46 is accommodated in the moisture absorbing space and the moisture absorbent 46 communicates with the inner space "S" of the housing 10. For example, the bracket 45 is formed in a shape including a plurality of openings 45*a*, and the moisture absorbing space may communicate with the inner space "S" of the housing 10 through the openings 45*a*.

A plurality of moisture absorbents 46 may be accommodated in the moisture absorbing space in the form of a pouch. For example, the moisture absorbent 46 may be made of a moisture absorbing material, a curable inorganic material, a polymer wax, or other widely-known moisture absorbing materials, wherein the moisture absorbing material includes at least one of a magnesium chloride, a calcium chloride, and a sodium carbonate.

In this way, as the moisture absorbent 46 may be provided in the repair cover 40, moisture may be prevented from occurring inside the housing 10, and thus occurrence of failures of optical components inside the housing 10 including the piezoelectric element 30 may be minimized.

Further, the moisture absorbent 46 may be easily replaced and managed by a detachable structure of the repair cover 40 and the housing 10 and a detachable structure of the bracket 45 and the repair cover 40.

Meanwhile, FIG. 3 illustrates a case in which there is no obstacle in the approach to the piezoelectric element 30 on an approach path for approaching the piezoelectric element 30 from the through-hole 16. In this case, when the repair cover 40 and the housing 10 are separated from each other, the operator may directly observe the piezoelectric element 30 through the through-hole 16 and easily approach the piezoelectric element 30.

Meanwhile, the vehicle lamp 1 according to another embodiment illustrated in FIGS. 8 to 10 may further include an interference component 70 located inside the housing 10 on the approach path for approaching the piezoelectric element 30 from the through-hole 16. Further, the interference component 70 may be detachably provided.

In detail, another embodiment illustrated in FIGS. 8 to 10 is an embodiment for enabling the approach to the piezoelectric element 30 when other components are present on the approach path for approaching the piezoelectric element 30. Here, a component that is positioned on the approach path for approaching the piezoelectric element 30 and covers the piezoelectric element 30 is defined as the interference component 70.

For example, the interference component 70 may be a component disposed inside the housing 10 and may be coupled to the outer lens 20, the housing 10, and other inner frames.

In this case, when the repair cover 40 and the housing 10 are separated, the interference component 70 covers the piezoelectric element 30, and thus the operator may not observe the piezoelectric element 30 or may not approach the piezoelectric element 30 through the through-hole 16. Thus, when there is the interference component 70 in an internal structure of the housing 10, it is necessary to remove the interference component 70 so that the operator approaches the piezoelectric element 30.

In the embodiment of the present disclosure, the interference component 70 may be provided separably from a coupling target 73 (e.g., the outer lens 20, the housing 10, the other inner frames, etc.). Accordingly, when the piezoelectric element 30 is repaired or replaced, the interference component 70 may be separated so that the operator may approach the piezoelectric element 30.

For example, an assembly member 75 for assembling the interference component 70 to the coupling target 73 may be further included, and the interference component 70 may be provided inside the housing 10 by a piece assembly structure method. For example, the assembly member 75 may be a component for enabling a piece assembly structure and may be a member such as a screw, a bolt, or a nut. Accordingly, it is easy to separate or replace the interference component 70 and the coupling target 73. The interference component 70 may be coupled to the coupling target 73 in various manners as long as the interference component 70 may be detachably assembled to the coupling target 73.

In this case, when the operator approaches the piezoelectric element 30, the repair cover 40 may be first separated from the housing 10, the interference component 70 may be then separated from the coupling target 73 and extracted through the through-hole 16, and the piezoelectric element 30 may be repaired or replaced. Thereafter, when the piezoelectric element 30 is completely repaired or replaced, the interference component 70 may be coupled to the coupling target 73 again.

With this structure, even when the interference component 70 is located on the approach path for approaching the piezoelectric element 30 from the through-hole 16, the operator may easily approach the piezoelectric element 30.

In this way, according to the embodiment of the present disclosure, it is easy to observe whether the piezoelectric element is defective, and even when the piezoelectric element is defective, the operator may approach the piezoelectric element and replace only the piezoelectric element.

The vehicle lamp 1 may include a controller or a processor (not shown) that is configured to control the piezoelectric element 30 to generate sound.

According to the embodiment of the present disclosure, unlike the related art in which the entire lamp should be replaced when the sound device is defective, only the piezoelectric element may be replaced, thereby reducing burden on consumers.

According to the embodiment of the present disclosure, since it is easy to manage the vehicle lamp capable of outputting sound, a communication function of the vehicle may be further activated and product competitiveness may be secured.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A vehicle lamp comprising:

a light source configured to generate light;

a housing having a front surface and a rear surface, and configured to open and close, and accommodate the light source;

an outer lens coupled to the housing to cover the front surface of the housing and configured to emit the light radiated from the light source to a front side;

a piezoelectric element mounted on a rear surface of the outer lens and configured to vibrate the outer lens; and a repair cover detachably coupled to the rear surface of the housing and configured to permit access to the piezoelectric element, wherein the housing has a through-hole configured to allow an accommodation space inside the housing and a rear side of the housing to communicate with each other, wherein the repair cover is provided to cover the housing, and wherein the repair cover includes:

a cover body portion configured to cover the through-hole; and a coupling portion extending from the cover body portion, inserted into the through-hole, and coupled to the housing.

2. The vehicle lamp of claim 1, wherein the housing has a housing screw thread formed on a circumference of the through-hole, and wherein the coupling portion has a cover screw thread engaged with the housing screw thread.

3. The vehicle lamp of claim 1, wherein the repair cover further includes:

a packing portion provided in the coupling portion to seal the through-hole and the repair cover therebetween.

4. The vehicle lamp of claim 1, wherein the repair cover further includes:

a bracket mounted on the coupling portion;

a moisture absorbing space formed to be surrounded by the bracket, the coupling portion, and the cover body portion and provided to communicate with an inner space of the housing; and a moisture absorbent accommodated in the moisture absorbing space.

* * * * *